Nov. 7, 1933.    V. J. TIHENKO    1,933,880
TANGENTMETER
Filed Jan. 27, 1930
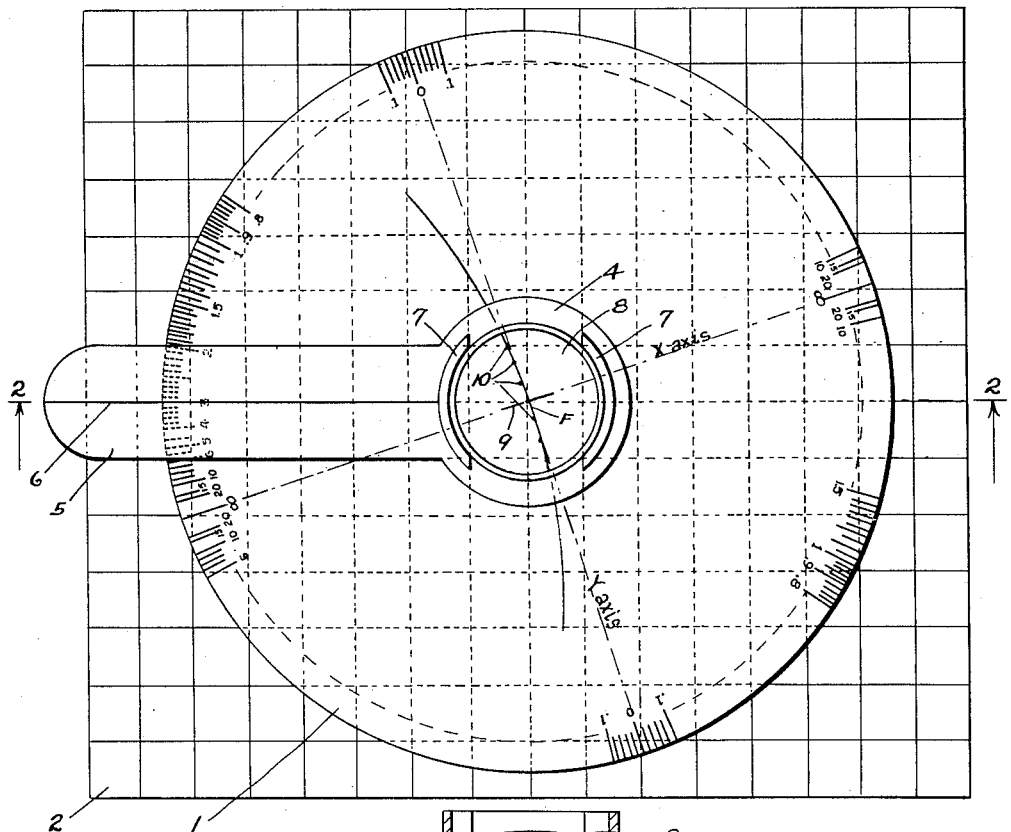
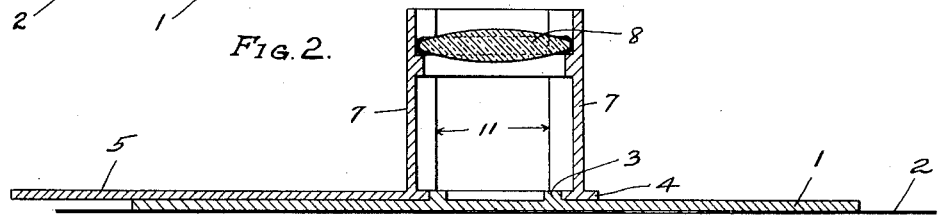
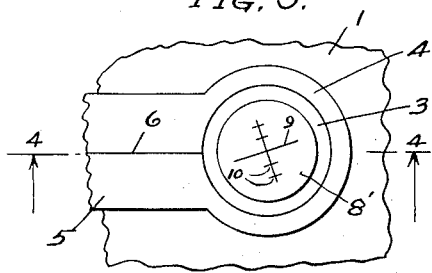
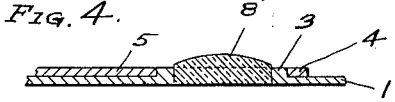
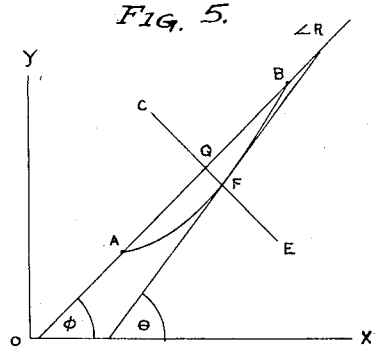
INVENTOR.
VLADIMIR J. TIHENKO
BY
ATTORNEYS.

Patented Nov. 7, 1933

1,933,880

UNITED STATES PATENT OFFICE 1,933,880

TANGENTMETER

Vladimir J. Tihenko, Berkeley, Calif.

Application January 27, 1930. Serial No. 423,707

4 Claims. (Cl. 33—75)

This invention relates to an instrument for interpreting curves drawn on a plane surface, and particularly for measuring the numerical value of the first derivative of ordinate with respect to abscissa at any point of any curve plotted on rectangular coordinate paper.

In the drawing Fig. 1 is a plan view of my instrument positioned on a sheet of coordinate paper inscribed with a curve under investigation.

Fig. 2 is a vertical cross section of Fig. 1 taken along the line 2—2 thereof.

Fig. 3 is an enlarged plan view of the central portion of the instrument showing a modification in arrangement of the lens and the locating dots formed by cross lines inscribed directly on the under face of the lens.

Fig. 4 is a cross section of Fig. 3 showing the modified lens mounting.

Fig. 5 is a greatly enlarged plan diagram showing a pair of the locating dots of the instrument applied to an irregular curve to illustrate the deviation of a tangent at point of investigation with a chord passing through the dots as discussed under curvature error herein.

In construction the instrument takes the form of a flat plate 1, preferably of transparent celluloid or the like and which plate may be of any shape, solid or spoked rim, but here shown as a round disk, in practice about 10 inches in diameter with graduations around its edge formed on the underside of the celluloid so that they will lie against the lines of the coordinate paper 2.

Around a central area of the instrument is an upstanding circular rim 3 and engaging which is the hub 4 of a radially extending arm or rider 5 preferably of transparent celluloid and which lies upon the disk 1 so that it may be freely rotated thereabout and is engraved with a hairline 6 on its underside which if extended would pass through the center of the disk.

This rider may have upstanding circular transparent celluloid walls 7 carrying a horizontally disposed reading glass 8 focused on the underside of the central area of the disk as shown in Figs. 1 and 2, or a plano-convex lens 8' may be permanently set within rim 3 with its flat side against the paper as shown in Figs. 3 and 4.

If the lens is spaced above the disk, the underside of the central area of the disk is inscribed with certain locating marks, but if the plano-convex lens is used the marks are engraved or etched directly upon the flat side of the glass.

These locating marks (much exaggerated in the drawing) comprise a short "middle line" 9 passing directly through the center of the instrument and which line is usually about ¼ inch long and about .01 inch in thickness, while formed along an imaginary line extending through the center of the instrument perpendicularly to the middle line and spaced equal distances "d" from both sides thereof is one or more pair of small points or dots 10, there being three pairs of the dots in the construction shown in Fig. 1.

For satsfactory results these dots should be about .012 inch in diameter and while the distances between any two dots not of the same pair is not important, the distances $D=2d$ between any two dots of the same pair should be less than one inch, and upon theoretical considerations the best values of D may be .98", .49". and .155".

If an imaginary line passing through and coinciding with the "middle line" be called the X-axis and an imaginary line passing through and coinciding with the dots be called the Y-axis, then two points of intersection of X-axis and two points of intersection of Y-axis with the outside circumference or scale graduations of the tangentmeter will be called and may be marked as two infinity and two zero points correspondingly. The range on the outside circumference of the top of the instrument between zero and infinity points is graduated by means of short division-lines directed from points on circumference toward the center; the graduations running from zero to infinity at any variable and convenient distances one from the other, and the value of any particular graduation is a value of natural trigonometric tangent of the angle formed by intersection of the X-axis with an imaginary line connecting the center of the instrument with this particular graduation.

In the construction shown in Figs. 3 and 4 the points or dots 10 are shown formed by the points of intersection of short lines crossing a continuous line engraved along the Y-axis and which is the easiest way to form the points on a glass surface in the precise positions and size desired.

In either construction the operation of the instrument is the same. The rider may be freely lifted from the disk if desired, and in the construction of Fig. 1 the openings 11 between the lens supporting walls as well as the transparency of the walls admits plenty of light for locating the dots upon the curve.

In order to find the numerical value of the first derivative at any desired point of the curve investigated, place the tangentmeter over the curve F, bottom side to the paper. Put the rider on the instrument. By translating and rotating the tangentmeter as a whole make two dots of any one pair coincide with the curve, the "middle line" intersecting the curve at the point investigated. Hold the tangentmeter disk against movement and rotate the rider until its reading or hairline 6 is parallel to abscissa. The graduation of the circumference under the reading line will indicate the numerical value of the first derivative of ordinate with respect to abscissa of the curve at the point of its intersection with the middle line.

If we superimpose any pair of dots on a curve, the imaginary line connecting these dots will be a chord of an arc of the curve between dots and which chord will be practically parallel to a line tangent to the curve at the point of intersection of the curve with the "middle line" of the instrument. Therefore, the value of the slope of the chord will be practically the value of derivative sought after. Such a statement is a result of a thorough mathematical investigation which cannot be discussed here at length but will be indicated briefly. The result obtained with the instrument is subject to independent errors: setting error and curvature error.

*Setting error* $\alpha$.—If one trys to superimpose a pair of perfectly circular dots on a drawn line, it is impossible to do it exactly because of the limited accuracy of human eyes. About 500 measurements with a highly magnifying device resulted in a good probability curve and disclosed that if we apply the instrument to a curved line of about .01 inch in thickness (average thickness of a line made by #3 hard pencil), and use a pair of dots of about .012 inch in diameter and .27 inch apart, and a lens magnifying about 2 diameters—then using the familiar Bessel formula, the probable error of a single observation will be .00062 radians or about 2 angular minutes. This error is evidently inversely proportional to a distance between two dots, i. e.

$\alpha = .00062 \frac{.27}{D}$ where D is any distance between dots expressed in inches, and although factor .00062 is a rather personal factor, it represents pretty well the order of magnitude of $\alpha$.

If (with respect to Fig. 5 of the drawing) AFB is a curve, A and B are the dots, D units apart, $AQ=QB=\frac{1}{2}D$ and CE is perpendicular to AB, then $\tan \phi$ will slightly differ from $\tan \theta$ i. e. from true derivative at point F.

If angle R is small, i. e. smaller than setting error $\alpha$, the error may be neglected. The angle R is a very complicated function of distance D between dots AB and a function of a radius of curvature.

As far as I am aware up to the present it has been considered impossible to evaluate R knowing D but not knowing the equation of the curve, and I have succeeded in finding an approximate equation and which showed that R is a function of $D^2$, of a first, second and third derivative of the curve, which derivatives may be found by means of the tangentmeter. Application of this equation to various known curves (quadratic, conic, logarithmic, exponential, etc.) showed that using reasonable values of D, the equation, although an approximate one, is of such a high degree of accuracy that for practical purposes may be considered exact.

Of course, no instrument of this character may be any more accurate than it is possible to read. Therefore, if the "curvature error" will be smaller or equal to "setting error" this must be the most accurate measurement attainable by the instrument. Thus equating setting error $\alpha$ to curvature error R, we can solve for D for any particular curve. Such value of D means that using it, in no place of the curve, will the curvature error exceed the setting error and therefore values given by the tangentmeter may be considered exact for all practical purposes when applied to curves drawn to ordinary scales.

Calculations for many various types of curves drawn to scales most commonly used, revealed that the best values for D range from .15 inch to .49 inch depending on curvature.

Taking a factor of safety 3, we therefore may state that accuracy of measurements is about 5 angular minutes. The speed of operation is about 10 seconds for a single determination of value of a tangent at any particular point.

The tangentmeter therefore enables one to locate quickly and accurately the direction of tangent line at any desired point of the curve, or otherwise expressed, the ratio of the sides of a triangle of which the tangent is the hypothenuse, thus giving the rise or fall of a curve relative to a base line.

The tangent scale of corresponding angles gives at once corresponding slopes, thus dispensing with customary practice of counting squares and figuring out ratios of ordinate to abscissa and enables one to take direct readings of the tangent, i. e. of the first derivative.

It is to be noted that in the investigation and interpretation of any curve, the first things which are always done, are estimation of the area under the curve and estimation of the first derivative at various points. While the problem of estimation of area is perfectly solved by using integrators (planimeters), the up-to-date methods and instruments if any for graphical differentiation are, as far as I am aware, much inferior to the tangentmeter with respect to both speed and accuracy. The chief advantages of the tangentmeter over other devices, are: low cost, simplicity of construction allowing rough handling, easiness and speed in operation, exactness and reliability of results.

*Fields of application.*—In any line of science or commerce wherever it is desired to know the rate of increase or decrease of any event process or phenomenon due to an increase or decrease in any other event process or phenomenon, thus almost indispensable in any line of insurance, statistics or engineering and chemical work, whenever any curve whose equation is not known is to be interpreted.

From the above disclosure it will be manifest that while the principal use of my tangentmeter is to determine the first derivative of ordinate with respect to abscissa and the circumferential scale is accordingly engraved with these values, yet the instrument may be additionally engraved with other scales giving other values such as the angle of either side of the triangle, percentages of rise and fall of the tangent relative to a horizontal base line, etc.

It is also evident that if the point on the curve under investigation should fall on one of the ruled lines of the paper, that the reading can be made without the use of the rider by simply following along the ruled line, as the main object of the hair line of the rider is to quickly guide one to the proper graduation, particularly when the point studied falls intermediate the ruled lines.

I therefore claim.

1. An instrument for reading directly in terms of slope comprising a plate with a transparent central area and having spaced locating marks on said area equidistant from the center of the instrument adapted for positioning over a curved line delineated on a plane surface for locating a point on said curve, said plate having a series of scale marks thereon designating slope values with respect to said curved line and a base line, said scale marks being positioned relative to the center of the instrument and to the locating marks whereby one of the scale marks on a line extending through the center of the instrument and parallel to a base line delineated on the plane surface on which said curved line is drawn, will indicate the correct slope value of the tangent line to the point on the curve located by said location marks.

2. An instrument for reading directly in terms of slope comprising a plate with a transparent central area provided with locating marks defining points spaced equidistant from the center of the instrument on a single line running through said center, a middle line formed on the area extending through said center perpendicular to said single line, and a series of scale marks around said plate designating values of tangent lines of a curve at various points along the curve, which points respectively are located by said locating marks, and the slope value of the tangent line to each point so located being identified by a line extending from the intersection of said middle line and said single line to one of said scale marks.

3. An instrument for reading directly in terms of slope comprising a plate with a transparent central area provided with means for optically locating any point on a curve plotted on coordinate paper, a series of scale marks on said instrument each expressing the numerical value of the first derivative of ordinate with respect to abscissa respectively at any point along such curve located by said means, and means extending from said central area to said scale marks adapted to pivot about the central area as an axis for relatively associating abscissa and whatever point is located on the curve by said locating means for identifying the scale mark indicating the correct numerical value of the first derivative of ordinate with respect to abscissa of such point.

4. An instrument for reading directly in terms of slope comprising a plate with a transparent central area provided with locating marks defining points spaced equidistant from the center of the instrument on a single line running through said center, a middle line formed on the area extending through said center perpendicularly to said single line, and a series of scale marks around said plate, each designating a value of the natural trigonometric tangent of an angle formed by the intersection of the single line running through said center and an imaginary line connecting the center of the instrument with one of said scale marks.

VLADIMIR J. TIHENKO.